United States Patent
Ho et al.

(10) Patent No.: US 11,148,025 B2
(45) Date of Patent: Oct. 19, 2021

(54) SQUASH TRAINING SYSTEM

(71) Applicant: SMARTER SQUASH SOLUTIONS, LLC, Reston, VA (US)

(72) Inventors: William S. Ho, Reston, VA (US); Zachary S. Ho, Reston, VA (US)

(73) Assignee: SMARTER SQUASH SOLUTIONS, LLC, Reston, VA (US)

( * ) Notice: Subject to any disclaimer, the term of this patent is extended or adjusted under 35 U.S.C. 154(b) by 28 days.

(21) Appl. No.: 16/251,028

(22) Filed: Jan. 17, 2019

(65) Prior Publication Data

US 2019/0217171 A1 Jul. 18, 2019

Related U.S. Application Data

(60) Provisional application No. 62/618,592, filed on Jan. 17, 2018.

(51) Int. Cl.
*A63B 60/46* (2015.01)
*A63B 71/06* (2006.01)
*A63B 24/00* (2006.01)
*A63B 1/00* (2006.01)
*G06T 7/246* (2017.01)

(52) U.S. Cl.
CPC ........... *A63B 60/46* (2015.10); *A63B 1/00* (2013.01); *A63B 24/0003* (2013.01); *A63B 71/0619* (2013.01); *G06T 7/246* (2017.01)

(58) Field of Classification Search
CPC .................... A63B 49/00; A63B 60/46
See application file for complete search history.

(56) References Cited

U.S. PATENT DOCUMENTS

| | | | | |
|---|---|---|---|---|
| 5,114,150 A * | 5/1992 | Matsumura | ........ | A63B 69/3614 473/222 |
| 8,840,483 B1 * | 9/2014 | Steusloff | ........ | A63B 60/16 473/222 |
| 2008/0085778 A1 * | 4/2008 | Dugan | ........ | A63B 69/3632 473/223 |
| 2008/0108462 A1 * | 5/2008 | Krysiak | ........ | A63B 41/08 473/603 |
| 2011/0183787 A1 * | 7/2011 | Schwenger | ........ | A63B 49/08 473/553 |
| 2012/0157241 A1 * | 6/2012 | Nomura | ........ | A63B 69/00 473/422 |
| 2014/0018181 A1 * | 1/2014 | Blake | ........ | G16H 20/30 473/277 |
| 2015/0051009 A1 * | 2/2015 | Davenport | ........ | A63B 53/04 473/223 |

(Continued)

*Primary Examiner* — Eugene L Kim
*Assistant Examiner* — Christopher Glenn
(74) *Attorney, Agent, or Firm* — Bayes PLLC

(57) ABSTRACT

A squash training system includes a sport sensor. The sport sensor includes a sensing unit configured to detect a motion of a racquet and generate three-dimensional (3D) motion data associated with the motion. The sport sensor also includes a memory configured to store the 3D motion data and a communication interface configured to transmit the 3D motion data to a terminal device. The squash system also includes at least one processor configured to receive the 3D motion data from the sport sensor and determine, based on the 3D motion data, at least one characteristic associated with the motion. The processor is also configured to render a graphical representation of the characteristic on a display.

16 Claims, 15 Drawing Sheets

(56) References Cited

U.S. PATENT DOCUMENTS

| | | | |
|---|---|---|---|
| 2015/0119159 A1* | 4/2015 | Sato | G06K 9/0055 |
| | | | 473/223 |
| 2015/0141178 A1* | 5/2015 | Mettler | A63B 24/0062 |
| | | | 473/553 |
| 2015/0335978 A1* | 11/2015 | Syed | A63B 69/3632 |
| | | | 473/223 |
| 2017/0312609 A1* | 11/2017 | Thornton | A63B 24/0003 |

* cited by examiner

SQUASH TRAINING SYSTEM

RELATED APPLICATION

This application claims the benefits of priority to U.S. Provisional Application No. 62/618,592, filed Jan. 17, 2018, the entire contents of which are expressly incorporated herein by reference.

TECHNICAL FIELD

The present application relates to squash sport, a squash training system, and a method for assisting squash training. More particularly, the present application relates to a squash training system utilizing a sport sensor to detect motions of a racquet in practicing squash.

BACKGROUND

Squash is an indoor racquet sport. The game of squash is played by two players (or four players for doubles) with racquets in a four-walled court with a small, hollow rubber ball. A player can direct the direction and control the speed of the ball as the racquet (or strings on the racquet) impacts the ball with varying angles and force. Traditionally, squash training relies on an on-site coach, who provides instructions to the players based on observation and experience. However, hiring a coach is expensive, and the availability of the coach may not be guaranteed. In addition, this instruction-based training approach lacks quantitative measures to evaluate how well a particular action, such as a swing, is performed. Some players make video recordings of their training routines and analyze their swings afterwards. While this approach provides a basis (e.g., the video recordings) for finer analyses, it lacks real time feedback to allow the players to make immediate improvements.

Embodiments of the present disclosure address the aforementioned problems by a squash training system providing instant feedback with rich quantitative performance measures based on racquet motion data collected by a sport sensor.

SUMMARY

In one aspect, a sport sensor for sensing motions of a racquet is provided. The sport sensor may include at least one sensing unit configured to detect a motion of the racquet and generate three-dimensional (3D) motion data associated with the motion. The sport sensor may also include a memory configured to store the 3D motion data and a communication interface configured to transmit the 3D motion data to a terminal device.

In another aspect, a squash training system is provided. The system may include a sport sensor associated with a racquet. The sport sensor may be configured to detect a motion of the racquet and generate 3D motion data associated with the motion. The system may also include at least one processor. The processor may be configured to receive the 3D motion data from the sport sensor. The processor may also be configured to determine, based on the 3D motion data, at least one characteristic associated with the motion. The processor may be further configured to render a graphical representation of the characteristic on a display.

In another aspect, a method for assisting squash training is provided. The method may include detecting, by a sport sensor, a motion of a racquet. The method may also include generating 3D motion data associated with the motion. The method may further include determining, based on the 3D motion data, at least one characteristic associated with the motion. In addition, the method may include rendering a graphical representation of the characteristic on a display.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
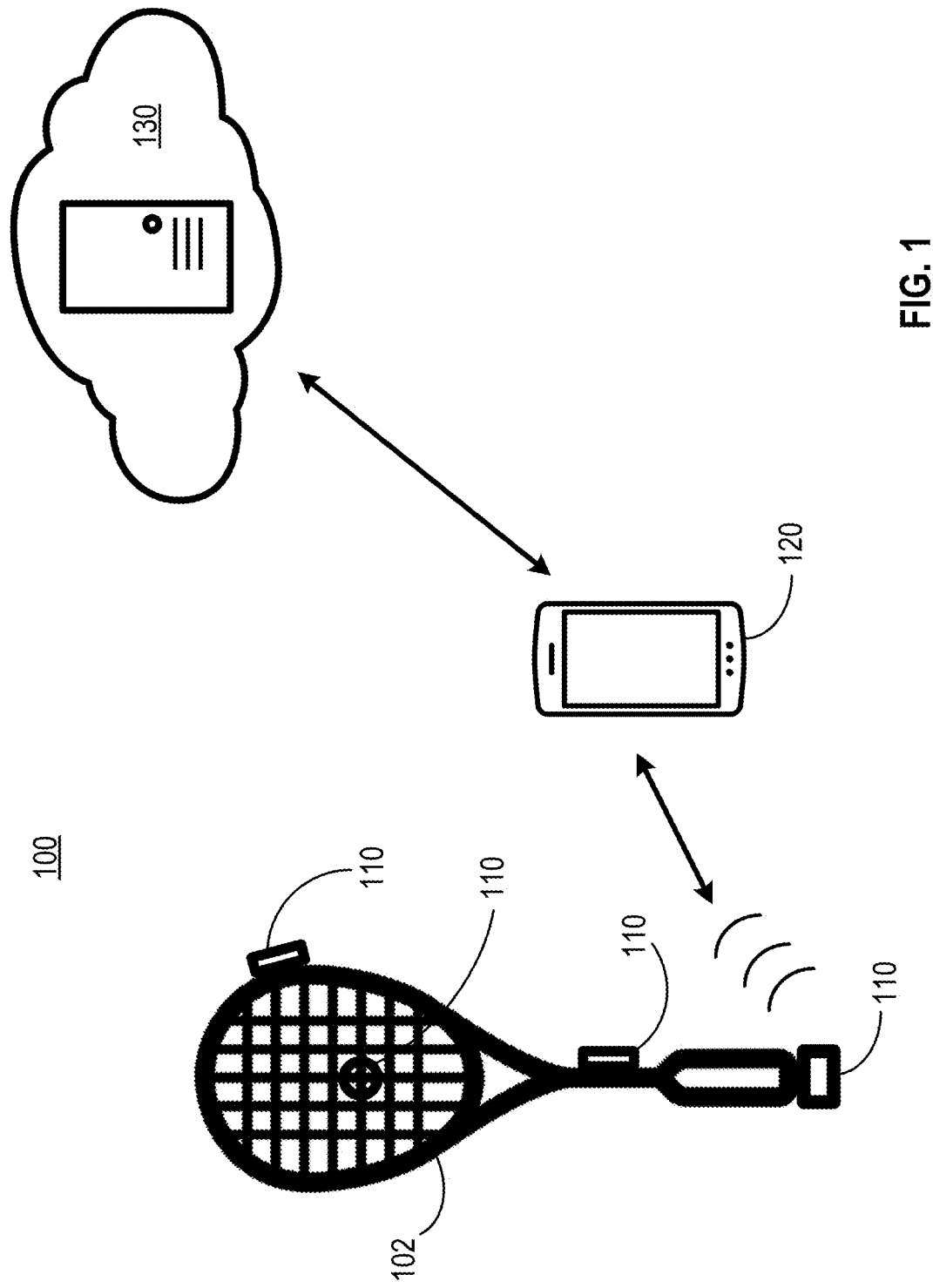
FIG. 1 illustrates a schematic diagram of an exemplary squash training system, according to embodiments of the disclosure.

FIG. 1 illustrates an exemplary squash training system 100, according to embodiments of the disclosure. System 100 may include a sport sensor 110 associated with a racquet 102. Racquet 102 may be a squash racquet used by a player to hit a squash ball during practicing squash. As used herein, the term "squash training" includes any activities of playing, practicing, or learning squash, including, for example, a squash training session, a squash practicing session, a squash learning session, a squash game, a squash match, a squash competition, etc. As shown in FIG. 1, sport sensor 110 may be attached to, mounted on, or otherwise associated with racquet 102 in various locations and in differing ways. For example, sport sensor 110 may be attached to (e.g., by an elastic pouch, a sticky pad, one or more screws, or any combination thereof) the base of the racquet handle. In another example, sport sensor 110 may be attached to the neck or the head of racquet 102. In a further example, sport sensor 110 may be attached to the strings of racquet 102. In a further example, sport sensor 110 may be embedded into racquet 102, for example, placed within the handle, neck, or head portion of racquet 102. The manner in which sport sensor 110 is attached to racquet 102 can vary depending on particular applications.

In some embodiments, sport sensor 110 may be removably attached to racquet 102 such that sport sensor 110 can be detached from racquet 102 after being attached to racquet 102. For example, sport sensor 110 may be held within a silicon sleeve, which in turn can be attached to as well as detached from the base of racquet 102. In another example, sport sensor 110 may be attached to the body of racquet 102 using a sticky tape, which may be removed without substantially damaging the racquet and/or sport sensor 110. In this way, multiple sport sensors can be switched (e.g., in case any one of them is out of power) without interrupting the squash training.

System 100 may also include a terminal device 120. Terminal device 120 may include, for example, a smart phone, a wearable device (e.g., a smart watch), a hand-held device, a tablet, a laptop, etc. Terminal device 120 may wirelessly connect to sport sensor 110 to exchange information with sport sensor 110. After receiving information collected by sport sensor 110, terminal device may process the information and, based on the information, render graphical representations on a display of terminal device 120.

In some embodiments, terminal device 120 may also exchange information with a server 130. Server 130 may include any suitable type of servers, including a local server, a remote server, a cloud server, a distributed server, a physical server, a virtual server, or any other suitable computing system. Server 130 may store information related to squash training. For example, information received or generated by terminal device 120 may be stored in sever 130. Server 130 may also perform various functions disclosed herein in conjunction with terminal device 120.

Figure 2:
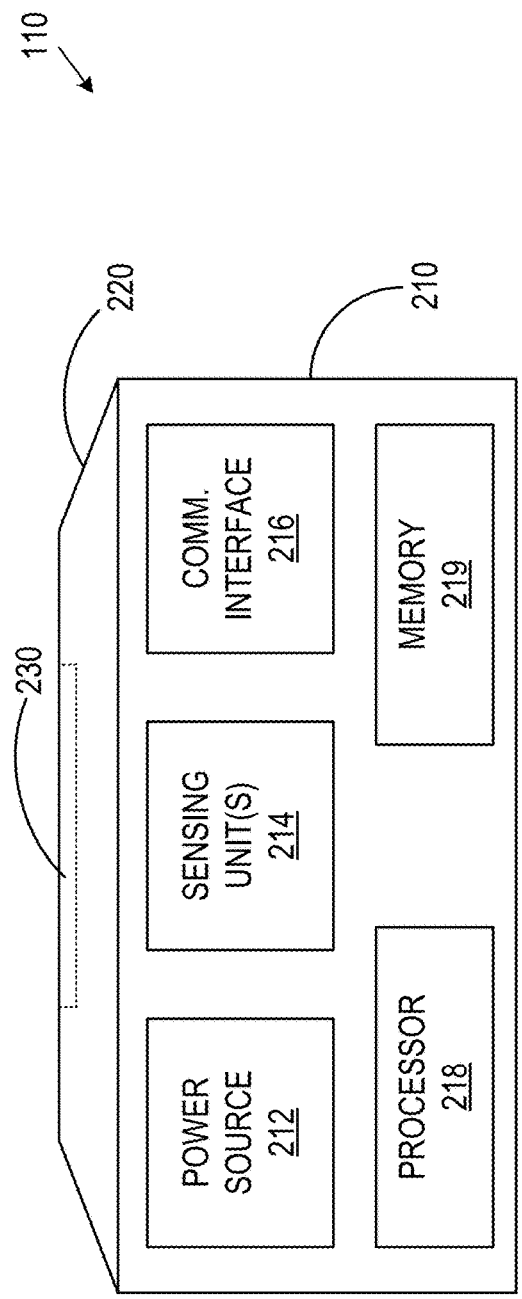
FIG. 2 illustrates a schematic diagram of an exemplary sport sensor, according to embodiments of the disclosure.
Figure 2:
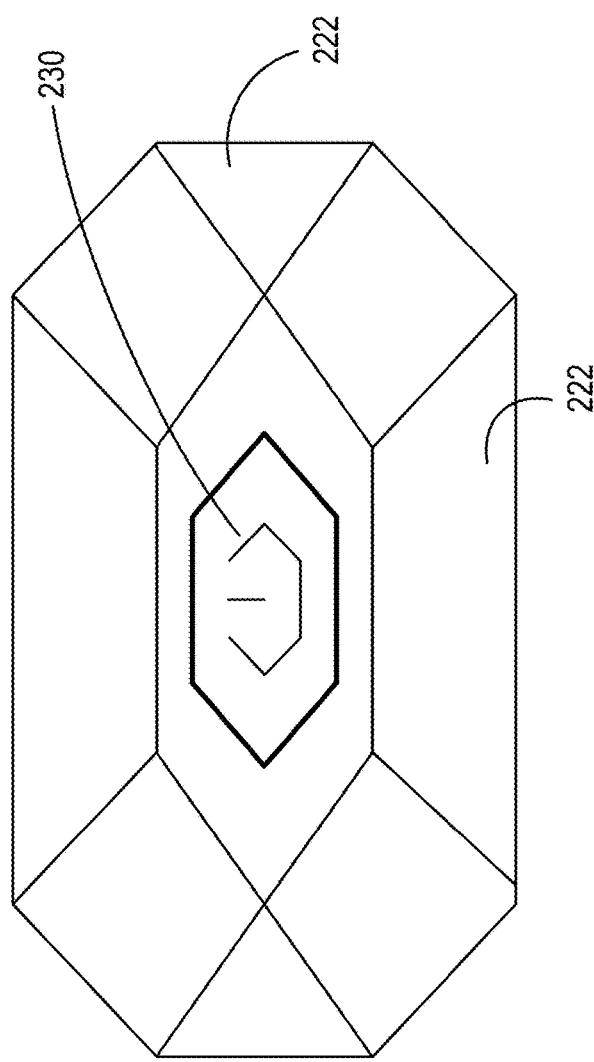

FIG. 2 illustrates a schematic diagram of an exemplary implementation of sport sensor 110, according to embodiments of the disclosure. The upper part of FIG. 2 shows a side view of sport sensor 110, while the lower part of FIG. 2 shows a top view of sport sensor 110. As shown in FIG. 2, sport sensor 110 may include a crown portion 220 and a base portion 210. Crown portion 220 may include a power switch 230 on an upper surface of sport sensor 110. A user may press power switch 230 to turn on/off sport sensor 110. The upper surface may exhibit a design pattern, such as polygons 222. Other design patterns may also be used.

Base portion 210 may host one or more hardware components of sport sensor 110, including, for example, a power source 212, one or more sensing units 214, a communication interface 216, a processor 218, and a memory 219. Power source 212 may be a battery (e.g., an alkaline battery, a button cell battery, a lithium-ion battery, etc.), an induction coil (e.g., for providing power through induction coupling), an RF antenna (e.g., for providing power through RF coupling), or any source of electric power. Power source 212 may supply power to other components of sport sensor 110.

Sensing unit(s) 214 may include a motion sensing unit (e.g., a linear motion sensing unit, an angular motion sensing unit, etc.), a direction sensing unit, an orientation sensing unit, an impact sensing unit, or any other sensing units for detecting motions, force, and/or power. For example, a motion sensing unit can be implemented by an accelerometer, a gyroscope, a combination thereof, etc.

Consistent with the embodiments disclosed herein, sensing unit(s) 214 may detect a motion of racquet 102 and generate 3D motion data. For example, the motion may be a swing of racquet 102. Sensing unit 214 may detect that racquet 102 moves during the swing and generate, for example, 3D linear and/or angular motion data corresponding to the swing. In some embodiments, the 3D linear motion data may include data representing linear displacement, speed, acceleration, and/or other parameters in three orthogonal directions. In some embodiments, the 3D angular motion data may include data representing angular displacement, speed, acceleration, and/or other parameters in three orthogonal directions. In some embodiments, sensing unit(s) 214 may also detect the speed of racquet 102 (e.g., at the head of racquet 102) and generate the speed data. In some embodiments, when racquet 102 or strings of racquet 102 hit a squash ball, the impact between the squash ball and racquet 102 or between the squash ball and the strings of racquet 102 may be detected and impact data may be generated by sensing unit(s) 214. The impact data may include data representing the force, power, time of impact, speed of impact, or other parameters relating to the impact. The 3D motion/impact data may be transmitted to terminal device 120 for further processing.

Communication interface 216 may include one or more communication adaptors to transmit and/or receive information with an external device, such as terminal device 120. In some embodiments, communication interface 216 may include a short-range wireless communication adaptor such as a Bluetooth™ module, an NFC module, etc. In some embodiments, communication interface 216 may include a wireless local area network (WLAN) adaptor. In some embodiments, communication interface 216 may include a wired communication adaptor such as a USB port. Sport sensor 110 may establish a communication link with terminal device 120 through communication interface 216 to transmit, for example, 3D motion data and impact data.

Processor 218 may include any suitable type of microprocessor, microchip, microcontroller, etc. Processor 218 may be configured to control other components of sport sensor 110, such as sensing unit(s) 214 to detect motion/impact and/or generate data. Processor 218 may also preprocess the generated data. In some embodiments, processor 218 may control establishment of a communication link between sport sensor 110 and terminal device 120 and transmission of data from sport sensor 110 to terminal device 120.

Memory 219 may include any suitable type of memory device, such as a RAM, a ROM, a flash drive, a memory card, etc. Memory 219 may store instructions executable by processor 218 to perform various functions of processor 218. Memory 219 may also store data (e.g., 3D motion data and/or impact data) generated by sensing unit(s) 214.

Figure 3:
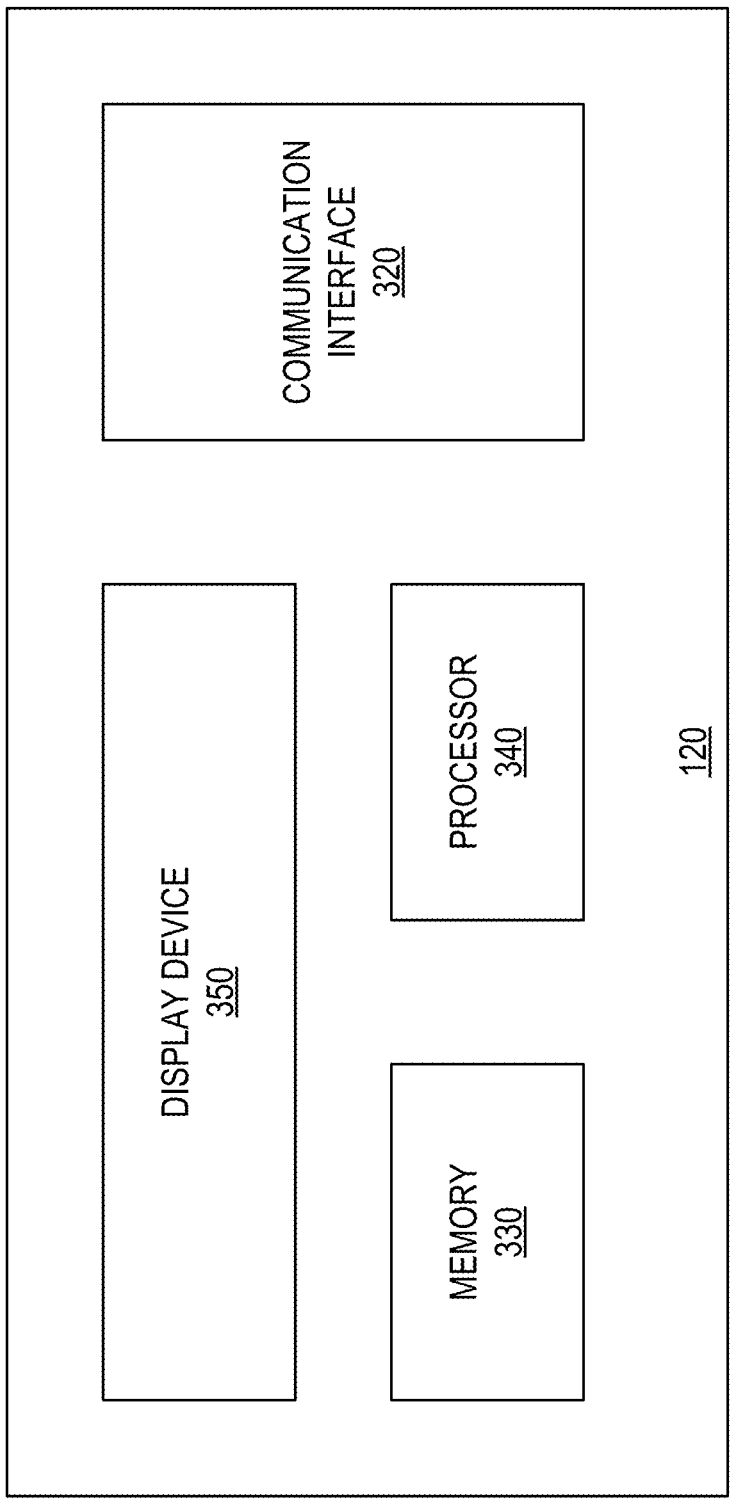
FIG. 3 illustrates a block diagram of a terminal device used in the system shown in FIG. 1, according to embodiments of the disclosure.

FIG. 3 shows a block diagram of an exemplary implementation of terminal device 120. As shown in FIG. 3, terminal device 120 may include a processor 340, a memory 330, a display device 350, and a communication interface 320. Terminal device 120 may implement various functions discloses herein alone or in conjunction with sport sensor 110 and/or server 130.

Communication interface 320 may be configured to send information to and receive information from other components of system 100 via communication links indicated by arrowed lines shown in FIG. 1. In some embodiments, communication interface 320 can include an integrated services digital network (ISDN) card, cable modem, satellite modem, or a modem to provide a data communication connection. As another example, communication interface 320 can include a local area network (LAN) card to provide a data communication connection to a compatible LAN. Wireless links can also be implemented by communication interface 320. In such an implementation, communication interface 320 can send and receive electrical, electromagnetic or optical signals that carry digital data streams representing various types of information via the communication links.

Processor 340 may include one or more processing devices configured to perform functions of the disclosed embodiments. Processor 340 may include any appropriate type of general-purpose or special-purpose microprocessor, digital signal processor, graphic processor, or microcontroller. In some embodiments, processor 340 may include a single core or multiple cores executing parallel processes simultaneously. For example, processor 340 can be a single-core processor configured with virtual processing technologies. In certain embodiments, processor 340 uses logical processors to simultaneously execute and control multiple processes. Processor 340 can implement virtual machine technologies, or other known technologies to provide the ability to execute, control, run, manipulate, and store multiple software processes, applications, programs, etc. In another embodiment, processor 340 may include a multiple-core processor arrangement (e.g., dual core, quad core, etc.) configured to provide parallel processing functionalities that allow processor 340 to execute multiple processes simultaneously. It is appreciated that other types of processor arrangements can be implemented that provide for the capabilities disclosed herein.

Memory 330 may include a volatile or non-volatile, magnetic, semiconductor-based, tape-based, optical, removable, non-removable, or other type of storage device or tangible and/or non-transitory computer-readable medium that stores one or more executable programs, such as a squash training application and an operating system. The programs may include software that, when executed by processor 340, performs various functions or operations to be discussed in greater detail below. The programs may also include communication software that, when executed by processor 340, provides communications using communication interface 320, such as communicating with sport sensor 110 and/or server 130.

Display 350 may include a display such as a Liquid Crystal Display (LCD), a Light Emitting Diode Display (LED), a plasma display, or any other type of display, and provide a Graphical User Interface (GUI) presented on the display for user input and data depiction. The display may include a number of different types of materials, such as plastic or glass, and may be touch-sensitive to receive inputs from the user. For example, the display may include a touch-sensitive material that is substantially rigid, such as Gorilla Glass™, or substantially pliable, such as Willow Glass™.

In some embodiments, sport sensor 110 may detect motions and/or impacts, generate 3D motion data and/or impact data, and transmit the generated data to terminal device 120. For example, sport sensor 110 may connect with terminal device 120 (e.g., via a wireless communication link) and transmit data in real time. In another example, sport sensor 110 may transmit data to terminal device 120 upon query from terminal device 120. In this way, data may be transmitted to terminal device periodically or in a lump-sum manner. For instance, data generated by generated by sensing unit(s) 214 and stored in memory 219 during a training session. After the training session concludes, sport sensor 110 may be connected to terminal device 120 and transmit the data stored in memory 219 to terminal device 120.

After receiving data from sport sensor 110, processor 340 may analyze the data and determine performance metrics. For example, processor 340 may determine, based on the received 3D motion data, one or more characteristics associated with a motion corresponding to the 3D motion data. In some embodiment, the motion may correspond to a swing of racquet 102. A swing may refer to a motion of racquet 102 starting from a relatively stable state to an acceleration state, followed by a deceleration state, and return to a relatively stable state.

In some embodiments, sport sensor 110 (e.g., using processor 218) may distinguish individual or unique swings. For example, when a player swings racquet 102 multiple times, sport sensor 110 may detect an individual swing out of the multiple swings. In some embodiments, sport sensor 110 may determine an individual swing by detecting the acceleration/deceleration states of racquet 102. In some embodiments, sport sensor 110 may determine an individual swing by detecting the speed of racquet 102 (e.g., for a relatively low speed to a relatively high speed and back to a relatively low speed). In some embodiments, sport sensor 110 may determine an individual swing by detecting the displacement of racquet 102 (e.g., linear displacement and/or angular displacement from a reference point). In some embodiments, sport sensor 110 may also apply filtering, de-noising, smoothing, or other signal processing techniques to improve the signal-to-noise ratio before determining individual swings. In some embodiments, sport sensor 110 may use threshold values (e.g., acceleration, speed, displacement, etc.) to determine the starting/ending points of an individual swing.

In some embodiments, determination of individual swings may be performed by processor 340 or jointly by processors 218 and 340. For example, sport sensor 110 may transmit raw data to terminal device 120 without preprocessing, and terminal device 120 may, using processor 340, to analyze the raw data and determine individual swings. In another example, sport sensor 110 may pre-process the raw data (e.g., denoising, filtering, smoothing, thresholding, etc.) before transmitting the data to terminal device 120. Terminal device 120 may then analyze the pre-processed data to determine individual swings.

In some embodiments, the type of an individual swing may be determined by processor 340 based on the received 3D motion data. For example, a squash swing can be categorized as a forehand swing or a backhand swing. In another example, a squash swing can be categorized as a drive, a lob, a drop, a boast, etc., depending on, for example, the way racquet 102 moves, the angle of racquet 102, the timing of impact (e.g., early, in-line, or late), etc. Different types of swings have different characteristics in terms of the 3D motion data associated therewith. Processor 340 may be configured to recognize the type of an individual swing based on the 3D motion data.

Figure 4:
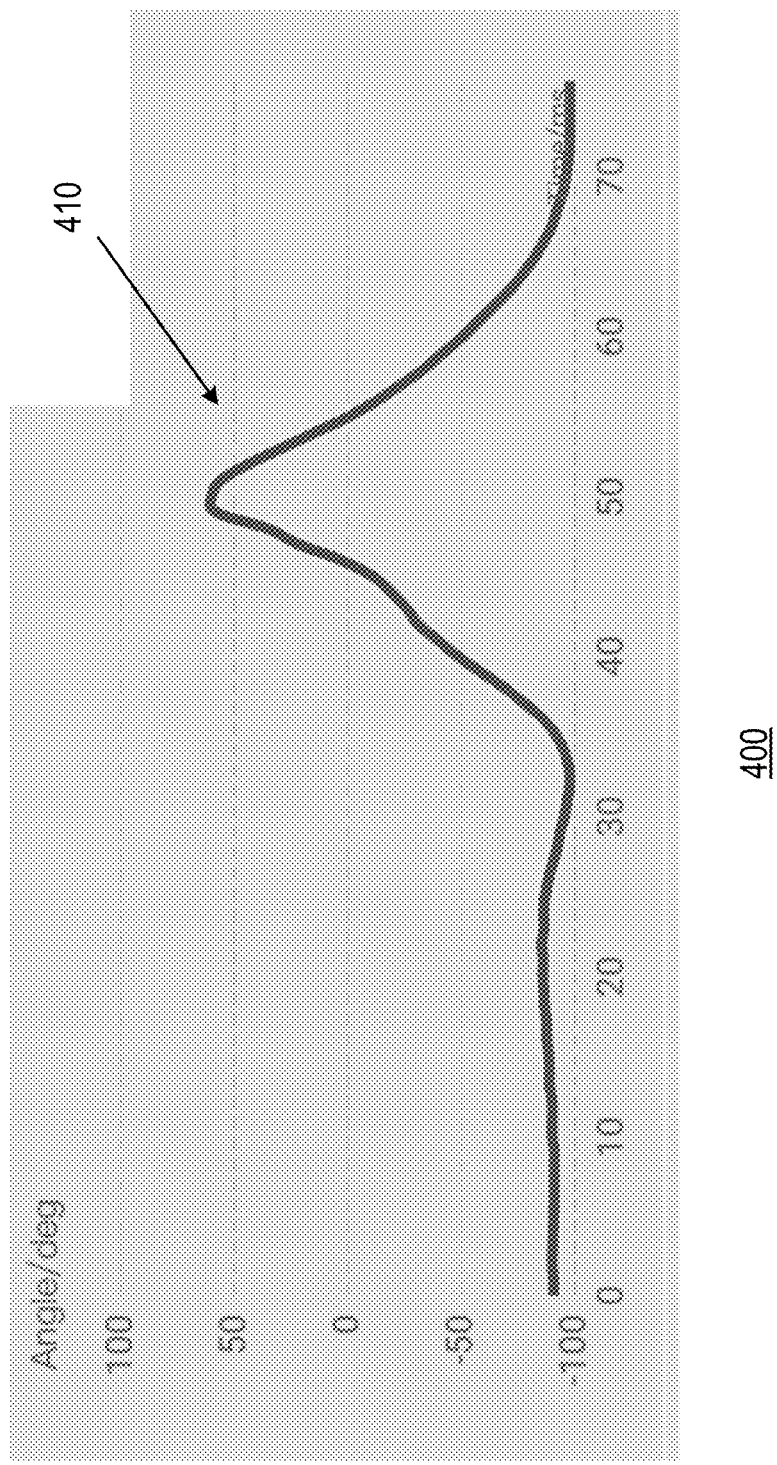
FIG. 4 illustrates an exemplary motion profile, according to embodiments of the disclosure.

In some embodiments, processor 340 may determine the type of an individual swing based on a motion profile extracted from the 3D motion data. FIG. 4 illustrates an exemplary motion profile 400. Referring to FIG. 4, motion profile 400 may be represented by the values of angular displacement as a function of time, shown in FIG. 4 as curve 410. The angular displacement data may be extracted from the 3D motion data received from sport sensor 110. Curve 410 exhibits certain features, such as a relatively flat starting portion, following by a substantially linear increase and a substantially linear decrease, and eventually back to the substantially same level as the starting portion. These features, including the shape of curve 410, the timing of the increase/decrease, the slope of the increase/decrease, the relative levels between the highest and lowest points, etc., may be used to characterize a particular type of swing. For example, curve 410 may correspond to a forehand drive swing. Processor 340 may compare the motion profile extracted from the 3D motion data with a reference motion profile characterizing a certain type of swing to determine the type of the motion (e.g., swing) corresponding to the motion profile. For example, one or more reference motion profiles may be stored in memory 330 and processor 340 may compare an extracted motion profile with the reference motion profiles and determine the type of the swing to be the one exhibiting the closest match. In another example, memory 330 may store certain features of the reference motion profiles instead of the actual curve and processor 340 may first calculate the corresponding features based on the 3D motion data for an individual swing and determine the type of the swing based on comparing the features. In some embodiments, the features may be stored in a form of a series of fundamental waveforms that collectively form or approximate the reference motion profile (e.g., via Fourier transform, spectrum analysis, etc.). The comparison between the extracted motion profile and the reference motion profile may be performed by comparing their corresponding fundamental waveforms.

In some embodiments, processor 340 may receive impact data from sport sensor 110 and determine an impact metric based on the impact data. For example, the impact data may include the force applied to racquet 102 or the strings of racquet 102, the time of impact, the relative speed of the impact, the acceleration of racquet 102, etc. Based on the impact data, processor 340 may determine power or force associated with the impact. For example, if the speed v of racquet 102 and the impact force F is detected by sensor 110, then the power P of the impact can be calculated as $P=F\times v$. In another example, the force F of the impact can be calculated as $F=m\times a$, where a is the acceleration of racquet 102 and m is the mass of the squash ball (e.g., a known value) hitting the strings of racquet 102. Other methods may also be used to determine the power or force of the impact.

Figure 5:
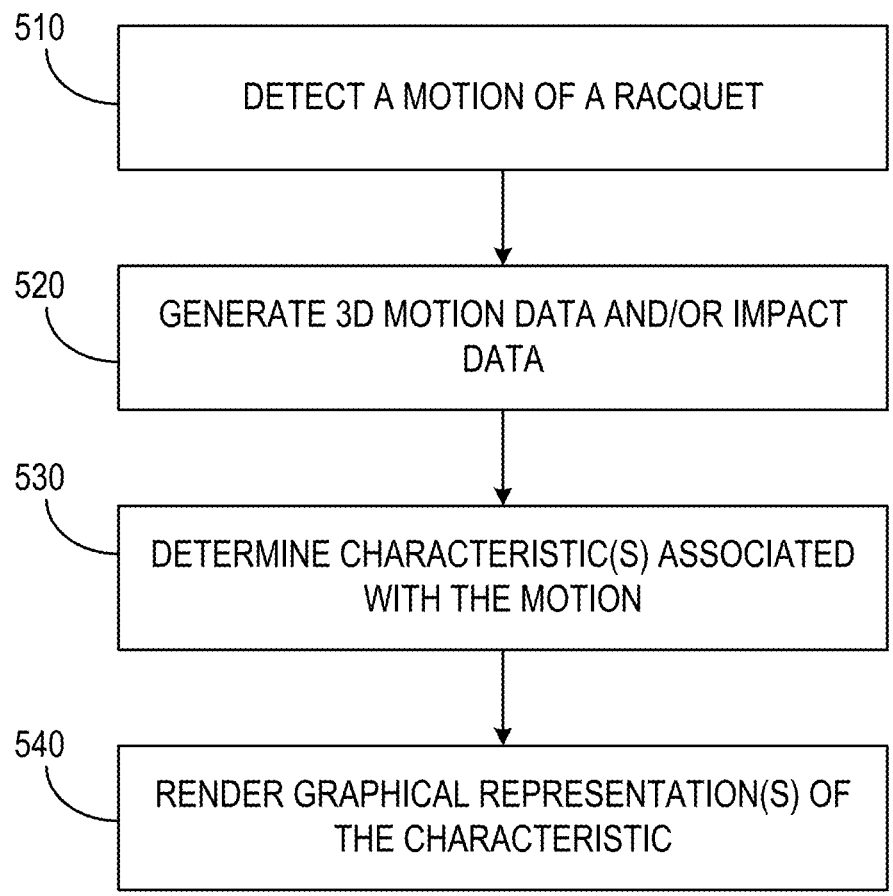
FIG. 5 is a flowchart of an exemplary method for assisting squash training, according to embodiments of the disclosure.

FIG. 5 is a flowchart of an exemplary method 500 for assisting squash training, according to embodiments of the disclosure. Method 500 may be implemented by system 100 that includes, among other things, sport sensor 110, memory 330, and processor 340 that performs various operations disclosed herein. In some embodiments, method 500 may be jointly performed by sensor 110, terminal device 120, and/or server 130. It is to be appreciated that some of the steps of method 500 may be optional to perform the disclosure provided herein, and that some steps may be inserted in the flowchart of method 500 that are consistent with other embodiments according to the current disclosure. Further, some of the steps may be performed simultaneously, or in an order different from that shown in FIG. 5.

In step 510, sport sensor 110 may detect, using sensing unit(s) 214, a motion of racquet 102. For example, the motion may correspond to an individual swing and sport sensor 110 may distinguish the individual swing from other swings. In step 520, sport sensor 110 may generate 3D motion data and/or impact data. For example, the 3D motion data may include linear and/or angular motion data in three orthogonal directions. The impact data may include force, time of impact, speed, or other relevant data associated with the impact. The generated data may be stored in memory 219 and may be transmitted to terminal device 120 through communication interface 216.

In step 530, processor 340 may determine one or more characteristics associated with the motion. For example, processor 340 may determine the type of a swing based on the associated motion profile extracted from the 3D motion data. In some embodiments, processor 340 may determine whether a swing is a forehand swing or a backhand swing. Processor 340 may further determine whether a swing is a drive, volley, drop, cross-court, boast, or lob swing, depending on the motion of racquet 102 (e.g., linear and/or angular profile as a function of time), the speed of racquet 102, the force/power of impact, etc. In some embodiments, processor 340 may determine whether a swing is a serve swing and/or whether the serve swing is a hard or lob serve swing. In some embodiments, processor 340 may determine the power and/or force of an impact between racquet 102 and a squash ball. Processor 340 may determine whether a swing hits a sweet spot that would optimize the performance based on a reference metric or a predetermined criterion. For example, a sweet spot for hitting the squash ball in a forehand drive may require the swing power, swing speed, and/or swing time to be within a certain range. Processor 340 may compare the metrics determined from the 3D motion data and/or impact data with reference metrics.

In step 540, processor 340 may render one or more graphical representations of the determined characteristic(s) on display device 350. FIGS. 6, 7A-7F, and 8-10 illustrate exemplary interfaces containing exemplary graphical representations. These exemplary interfaces may be implemented by a squash training application (e.g., a mobile app) running on terminal device 120.

Figure 6:
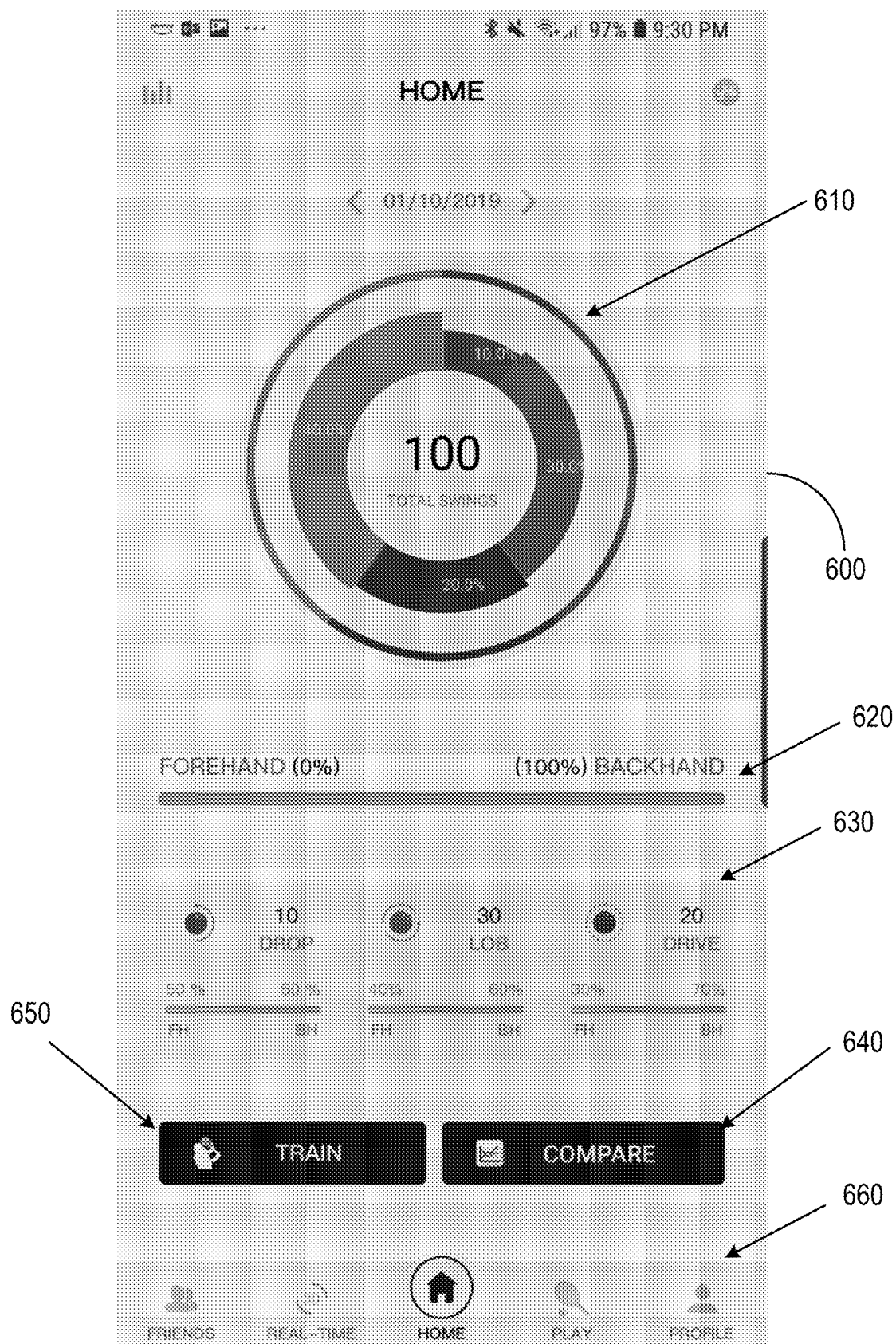
FIGS. 6, 7A-7F, and 8-10 are exemplary user interfaces displayed by the terminal device shown in FIG. 3, according to embodiments of the disclosure.

FIG. 6 shows an exemplary main interface 600. Referring to FIG. 6, main interface 600 may include a chart 610 indicating the total number of swings and the percentage numbers of each type of swings. For example, chart 610 shows that out of the 100 swings, 10% are drop swings, 30% are lob swings, 20% are drive swings, and 40% are other types of swings (e.g., swings that are not within any of the drop, lob, and drive categories). Main interface 600 also include an information bar 620 indicating the percentage numbers of the forehand and backhand swings. For example, information bar 520 shows that the 100 swings are all backhand swings. A detail information section 630 shows the number of swings of each type (drop, lob, drive, other) and the percentage numbers of forehand and backhand swings within each type. Button 640 is used to open another interface showing comparisons between the player's performance and a professional's performance. Button 650 is used to open another interface for recording a new training session. A tab section 660 is provided at the bottom of main interface 600 showing other functional tabs provided by the squash training application.

Figure 7A:
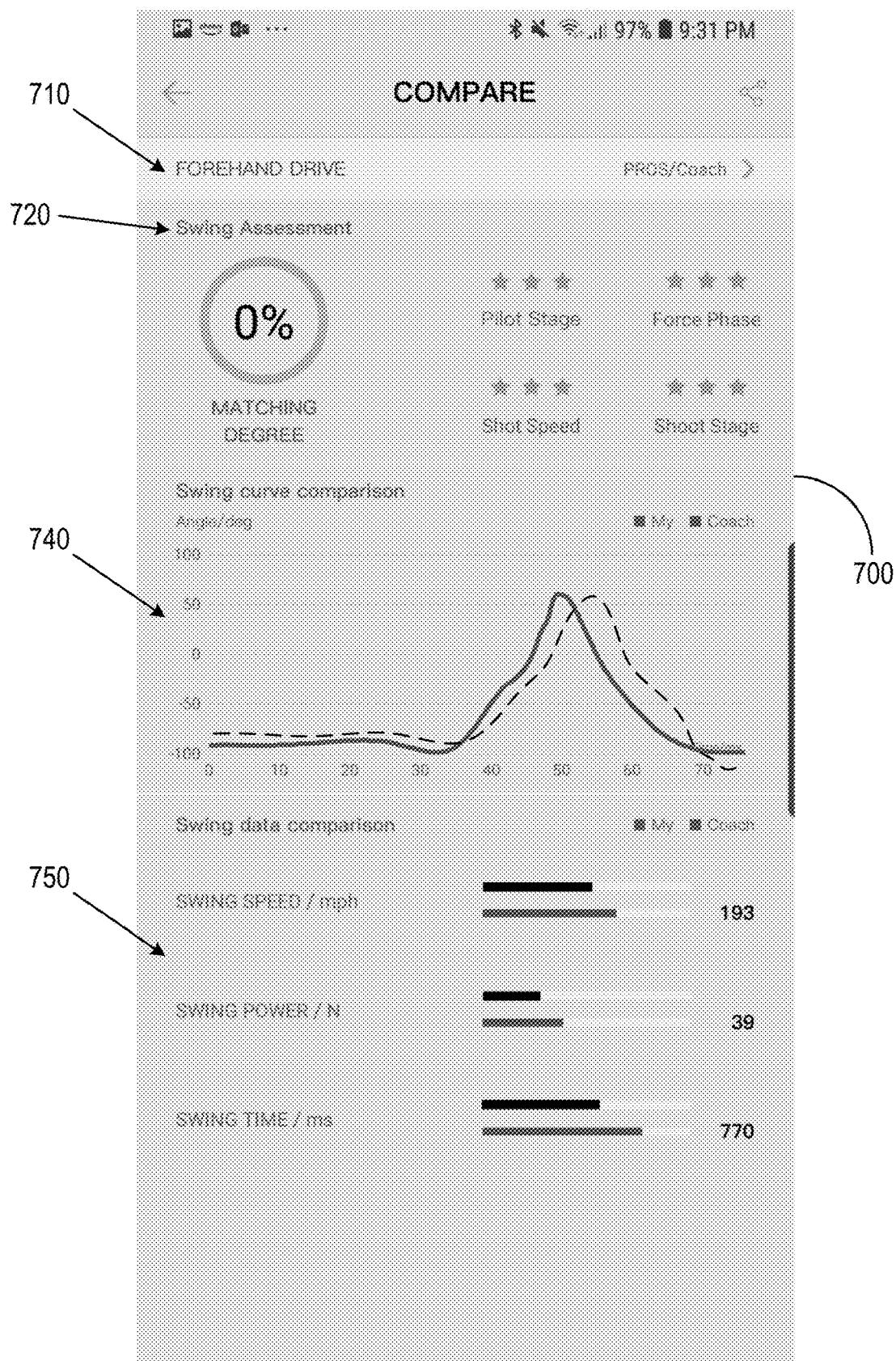

FIGS. 7A-7F show exemplary comparison interfaces, which may be displayed after button 640 is clicked. Referring to FIG. 7A, a comparison interface 700 includes a swing type indication bar 710, a swing assessment section 720, a swing curve comparison section 740, and a swing data comparison section 750. Swing type indication bar 710 shows the type of swing currently being compared. For example, swing type indication bar 710 shows that forehand drive is the type of swing currently being compared with data from professional(s)/coach(s). Swing assessment section 720 includes a percentage indicator indicating the degree of matching, and individual ratings focusing on various aspects. For example, a three-star rating system is used to assess the play's forehand drive performance in the pilot stage, force phase, shoot stage, as well as the shot speed of the swing. Based on the analysis of the 3D motion data and/or impact data generated by sport sensor 110, performance data (e.g., in various stages/phase) may be determined by processor 340 (e.g., based on the time or features of the motion curve). These performance data may be compared with corresponding performance data obtained from professional players or coaches to evaluate the performance of the player. For example, swing curve comparison section 740 shows a curve of a professional play (solid line) and a corresponding curve (dashed line) of the player. In addition, swing data comparison section 750 may shows comparisons of performance metrics such as swing speed, swing power, and swing time.

Figure 7B:
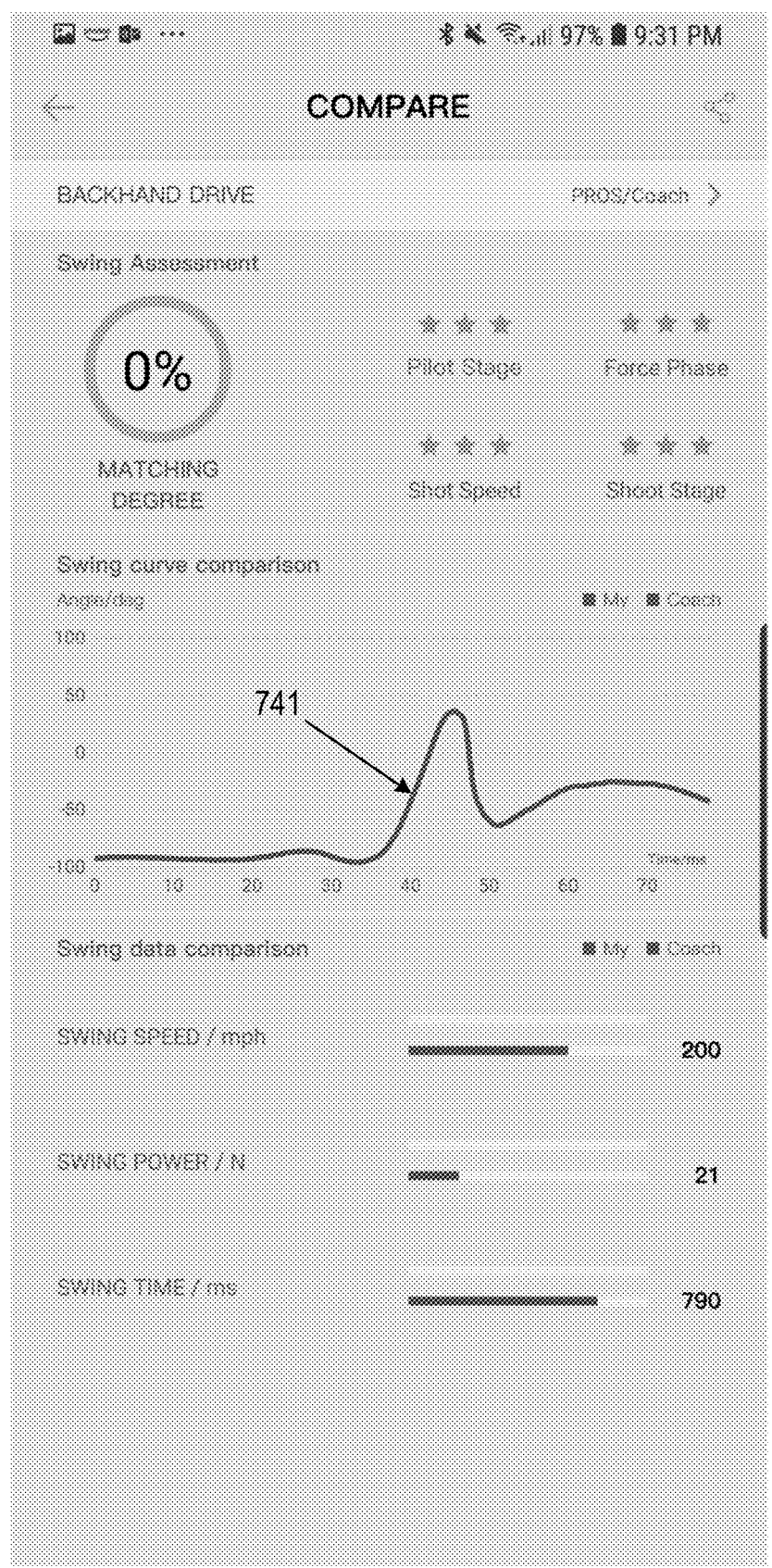
Figure 7C:
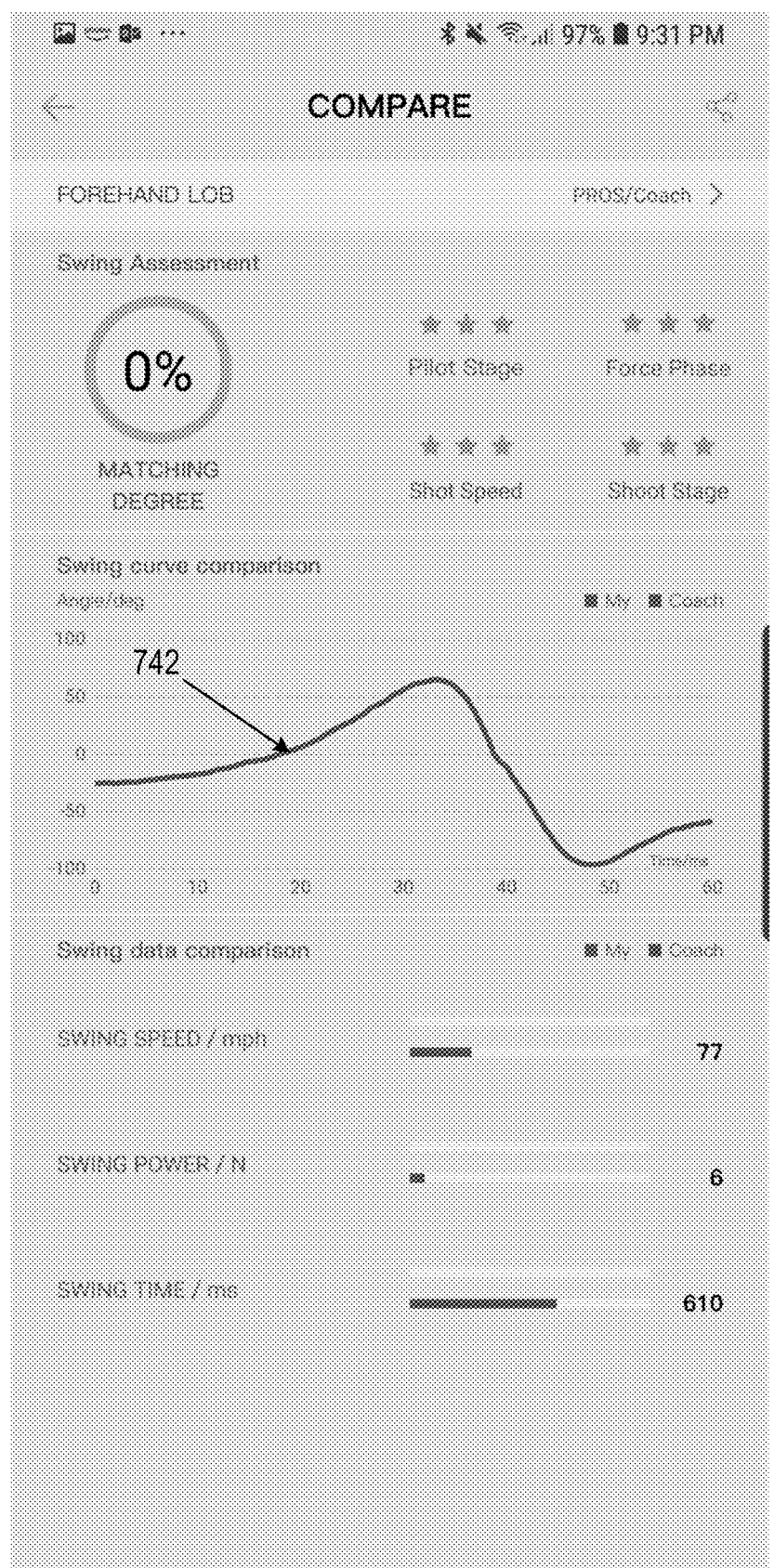
Figure 7D:
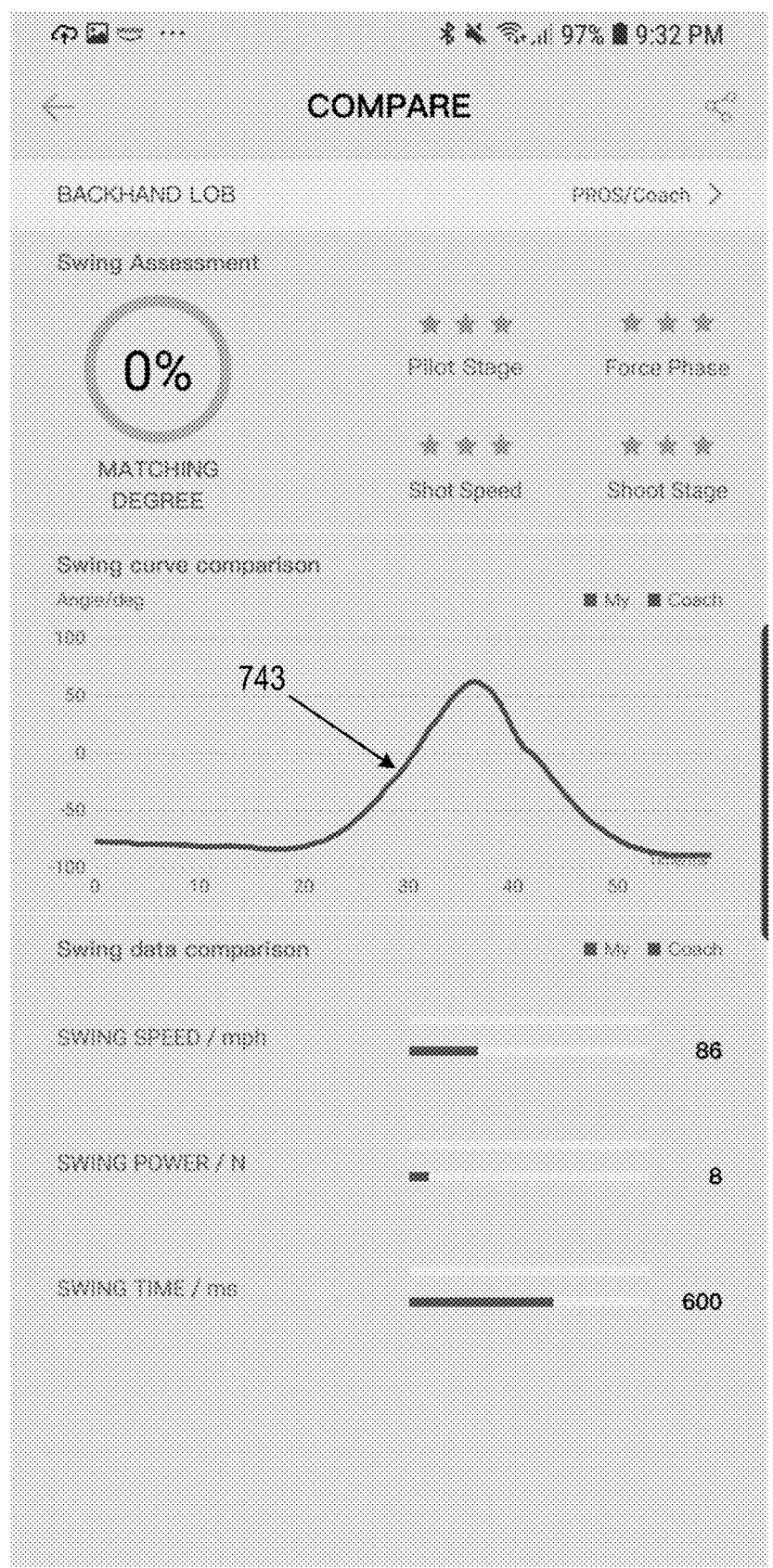
Figure 7E:
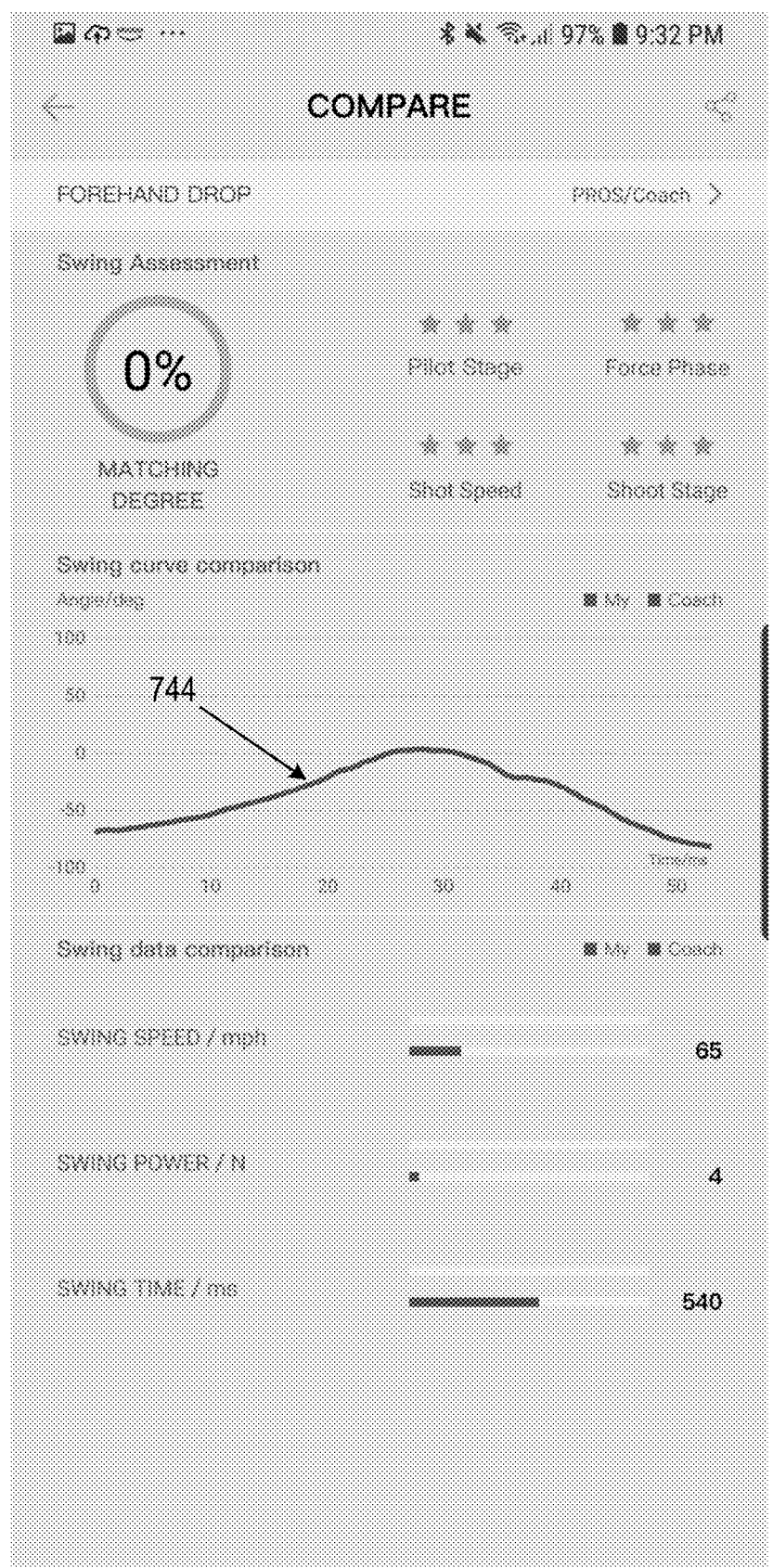
Figure 7F:
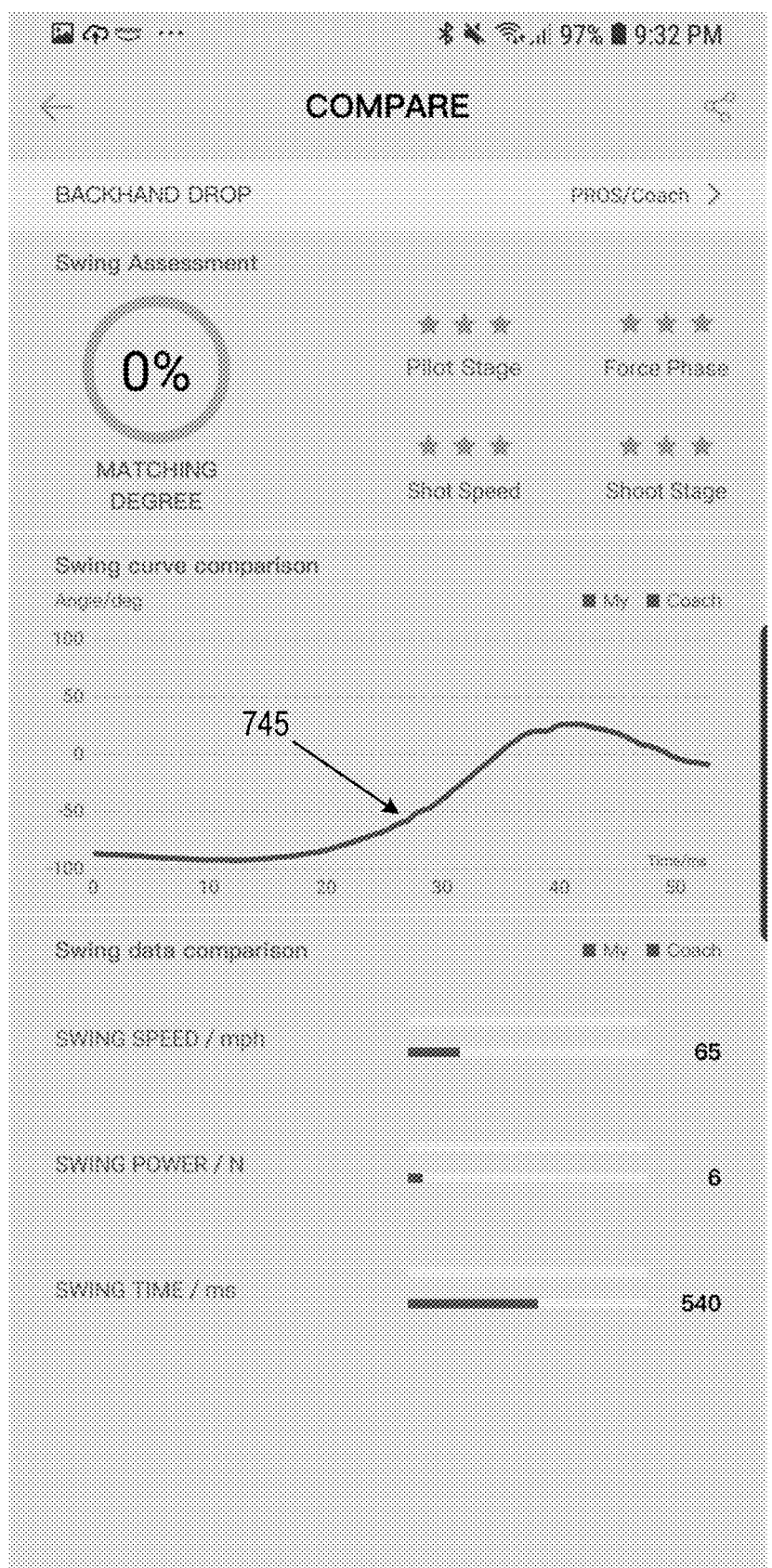

FIGS. 7B-7F show similar interfaces but with different types of swings. FIG. 7B shows a comparison interface of backhand drive swings and a professional curve 741. FIG. 7C shows a comparison interface of forehand lob swings and a professional curve 742. FIG. 7D shows a comparison interface of backhand lob swings and a professional curve 743. FIG. 7E shows a comparison interface of forehand drop swings and a professional curve 744. FIG. 7F shows a comparison interface of backhand drop swings and a professional curve 745. In some embodiments, the professional curves may also be used as reference curves to determine the type of an individual swing.

Figure 8:
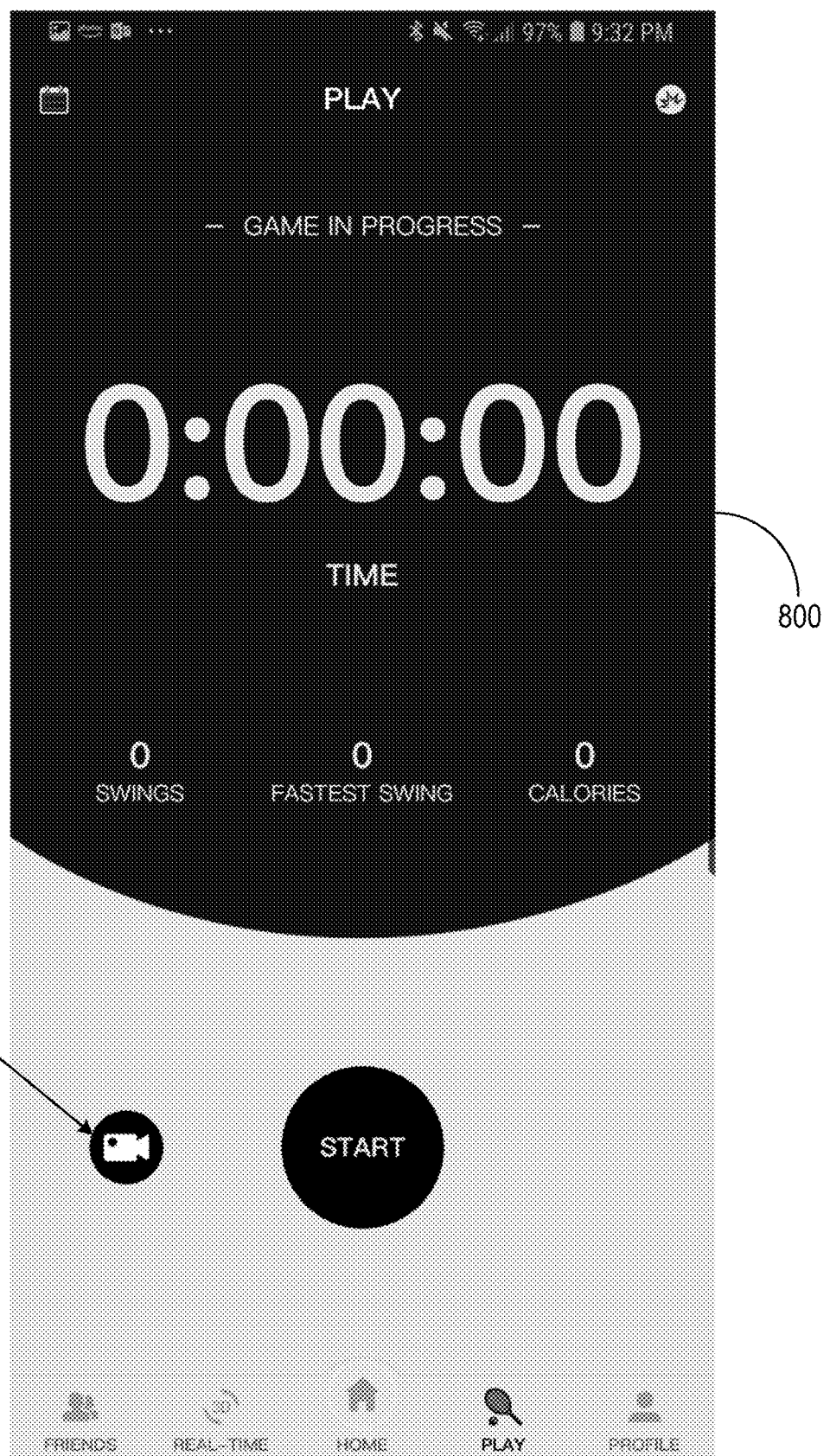

FIG. 8 shows an interface 800 of recording a training session or a game. Interface 800 may be activated by clicking the "Play" tab in section 660 of the main interface 600. The player can start the recording by click the "START" button displayed on interface 800. The play time, number of swings, the fastest swing, and calories may be also be displayed on interface 800. During a game play, the power, racquet head speed, and/or swing speed values can be displayed on interface 800 and may be refreshed for individual swings. For example, when racquet 102 impacts a squash ball, the value(s) of the power, racquet head speed, and/or swing speed may be displayed or refreshed to reflect the instant impact metrics. FIG. 8 also include a video recording button 810 to allow the player to video record the practice or training session. The recorded video may be stored locally on terminal device 120 (e.g., in memory 330) and/or may be uploaded to server 130. Video analysis may be performed in conjunction with the motion/impact analysis to determine performance metrics. In some embodiments, videos of professional players and/or coaches may be used to compare with the video of the player.

Figure 9:
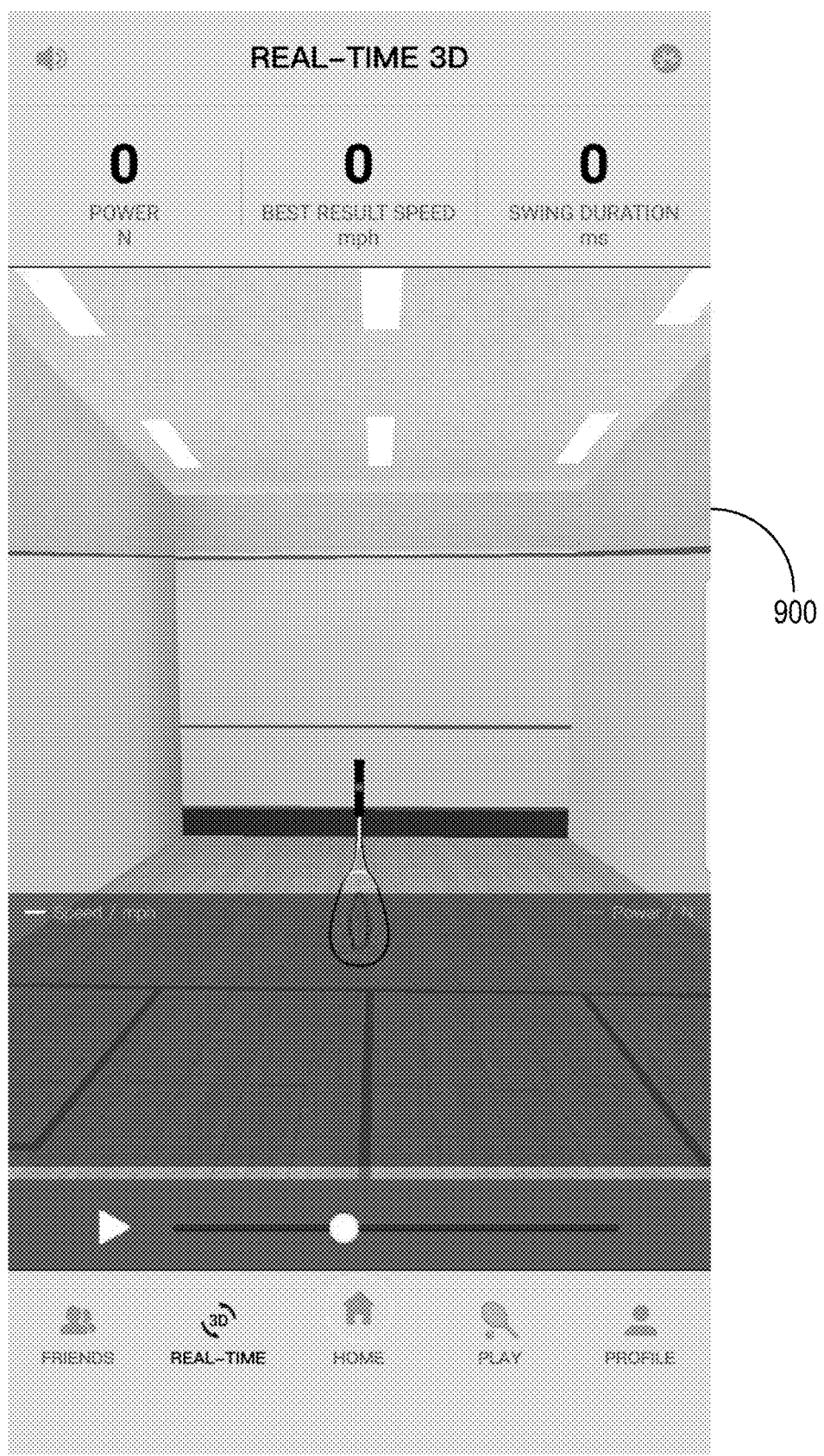

FIG. 9 shows a real-time 3D interface 900. Interface 900 may be displayed after clicking the "REAL-TIME" tab in tab section 660 of interface 600. Interface 900 may display the motion of racquet 102 in a 3D setting based on 3D motion data generated by sport sensor 110. In some embodiments, the 3D display may be a replay of a motion captured by sport sensor 110. In some embodiments, the 3D display may be a real time display of the motion of racquet 102 as the player is playing the game. Performance metrics, such as power, speed, swing duration, may be displayed on interface 900.

Figure 10:
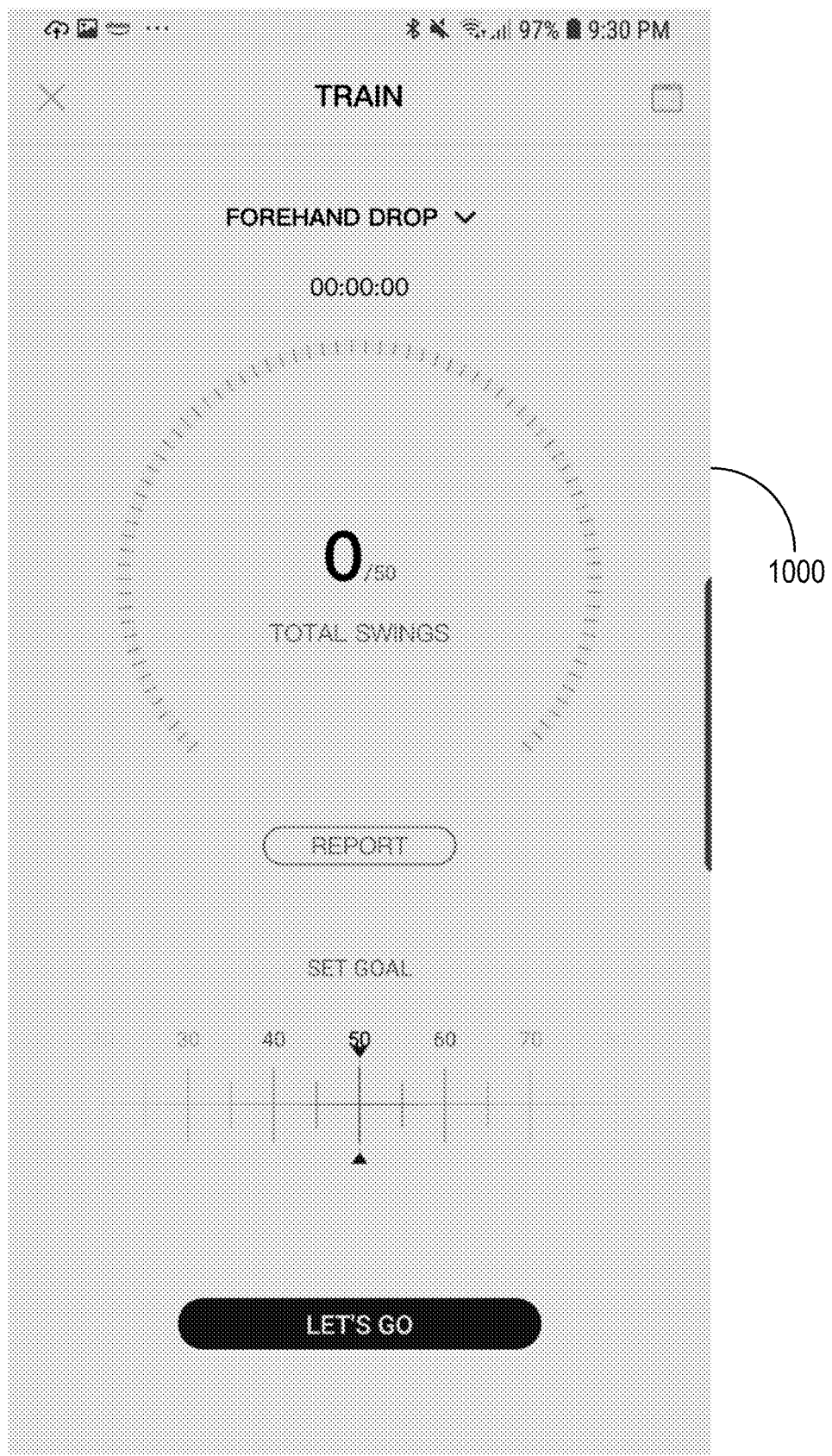

FIG. 10 shows a training interface 1000. Interface 1000 may be displayed after clicking button 650 displayed on interface 600. Interface 1000 may display the number of a particular type of swings the player practices. For example, as the player is practicing swings, the type of an individual swing can be determined by processor 340. If the type matches the type shown in interface 1000, then the number of total swings of that particular type may be incremented 1. Otherwise, the number of the total swing of that particular type may stay the same.

In some embodiments, a player may set up the profile of racquet 102 such that the performance metrics may be calibrated based on the particular profile. For example, the reference motion profiles used to determine the type of swings may be adjusted accordingly based on the calibration.

In some embodiments, processor 340 may analyze the distribution of swings based on the types, impact metrics, or other performance metrics. For example, the number of a particular type of swing may be determined, the associated intensity, such as the power/speed/force of the swings may be analyzed.

In some embodiments, a coach may be allowed to access the performance metrics of a student or trainee to evaluate the training progress. For example, terminal device 120 of an individual trainee may upload performance metrics to server 130. The coach may then access the data stored in server 130 to access the performance metrics of the individual trainee.

In some embodiments, a coach-version squash training application or a coach mode of the squash training application may be provided to display a coach portal interface. The coach portal interface may display one or more trainees' squash training performance metrics and may generate reports of the trainee users. The coach portal interface may be displayed on a terminal device similar to terminal device 120 (e.g., tablet, computer browser, smartphone, etc.)

In some embodiments, the coach portal interface may allow a coach to view his/her students/trainees via an opt-in process or through a "friend" function as a security layer. In some embodiments, the coach portal interface may provide review functions to allow the coach to review student user data. The coach portal interface may also provide reporting functions to generate reports from an individual student user data or an aggregate of all students of the coach according to sortable values such as swing speed, racquet head speed, and/or power.

In some embodiment, the coach portal interface may provide an exporting function to export screen displays, user data, analyses, reports, or the like to an electronic file (e.g., PDF file) for sharing (e.g., via email) or printing out.

In some embodiments, the coach portal interface may contain similar elements to interfaces 600, 700, 800, 900, and 1000, with additions and/or adjustments designed specifically for coaches.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. The computer-readable medium may be a disc, a flash drive, or a solid-state drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A sport sensor for sensing motions of a racquet, comprising:
 at least one sensing unit configured to detect a motion of the racquet;
 a processor configured to determine that the motion corresponds to an individual swing of the racquet based on the detected motion, wherein the at least one sensing unit is further configured to generate three-dimensional (3D) motion data corresponding to the individual swing, and wherein the 3D motion data include a motion profile in a form of a first series of fundamental waveforms;

a memory configured to store the 3D motion data; and
a communication interface configured to transmit the 3D motion data to a terminal device configured to:
determine the first series of fundamental waveforms of the motion profile from the 3D motion data;
compare the first series of fundamental waveforms of the motion profile with a plurality of reference profiles each comprising a second series of fundamental waveforms, each of the plurality of reference profiles being associated with a different category of swing, and the second series of fundamental waveforms of each of the plurality of reference profiles being different; and
determine a type of swing associated with the 3D motion data from the different categories of swings based at least in part on the comparison of the first series of fundamental waveforms of the motion profile with the second series of fundamental waveforms of the plurality of reference profiles.

2. The sport sensor of claim 1, wherein the 3D motion data comprise 3D linear motion data.

3. The sport sensor of claim 1, wherein the 3D motion data comprise 3D angular motion data.

4. The sport sensor of claim 1, wherein the at least one sensing unit is configured to:
detect an impact between a squash ball and the racquet or between the squash ball and strings of the racquet; and
generate impact data associated with the impact.

5. The sport sensor of claim 1, wherein:
the at least one sensing unit is configured to detect the motion of the racquet by detecting a speed of the racquet; and
the processor is configured to determine that the motion corresponds to the individual swing of the racquet when the detected speed changes from a relatively low speed to a relatively high speed and then changes back to another relatively low speed.

6. The sport sensor of claim 1, wherein:
the at least one sensing unit is configured to detect the motion of the racquet by detecting a displacement of the racquet; and
the processor is configured to determine that the motion corresponds to the individual swing of the racquet when the detected displacement exceeds a threshold from a reference point.

7. The sport sensor of claim 1, wherein:
the at least one sensing unit is configured to detect the motion of the racquet by detecting an acceleration or deceleration state of the racquet; and
the processor is configured to determine that the motion corresponds to the individual swing of the racquet based on the detected acceleration or deceleration state of the racquet.

8. A squash training system, comprising:
a sport sensor associated with a racquet, the sport sensor being configured to detect a motion of the racquet and generate three-dimensional (3D) motion data associated with the motion;
a memory storing a plurality of reference motion profiles each comprising a first series of fundamental waveforms, each of the plurality of reference profiles being associated with a different category of swing, and the first series of fundamental waveforms of each of the plurality of reference profiles being different; and
at least one processor configured to:
receive the 3D motion data from the sport sensor;
extract a motion profile from the received 3D motion data;
determine a second series of fundamental waveforms of the motion profile from the 3D motion data;
compare the second series of fundamental waveforms of the motion profile with the first series of fundamental waveforms of the plurality of reference profiles;
determine a type of swing associated with the 3D motion data from the different categories of swings based at least in part on the comparison of the second series of fundamental waveforms of the motion profile with the first series of fundamental waveforms of the plurality of reference profiles; and
render a graphical representation of the information associated with the type of swing on a display.

9. The system of claim 8, wherein:
the motion corresponds to an individual swing of the racquet.

10. The system of claim 9, wherein the type of the swing comprises a forehand swing or a backhand swing.

11. The system of claim 9, wherein the type of the swing comprises a drive, a lob, a drop, or a boast.

12. The system of claim 9, wherein the processor is configured to render a real-time 3D display of the swing based on the 3D motion data.

13. The system of claim 8, wherein the processor is configured to render a comparison between the motion profile and a reference profile on the display.

14. The system of claim 8, wherein:
the sport sensor is configured to:
detect an impact between a squash ball and the racquet or between the squash ball and strings of the racquet; and
generate impact data associated with the impact; and
the processor is configured to:
receive the impact data; and
determine an impact metric based on the impact data.

15. The system of claim 14, wherein the impact metric comprises power or force associated with the impact.

16. The system of claim 8, wherein the different categories of swings comprise a drive, a lob, a drop, and a boast.

* * * * *